UNITED STATES PATENT OFFICE.

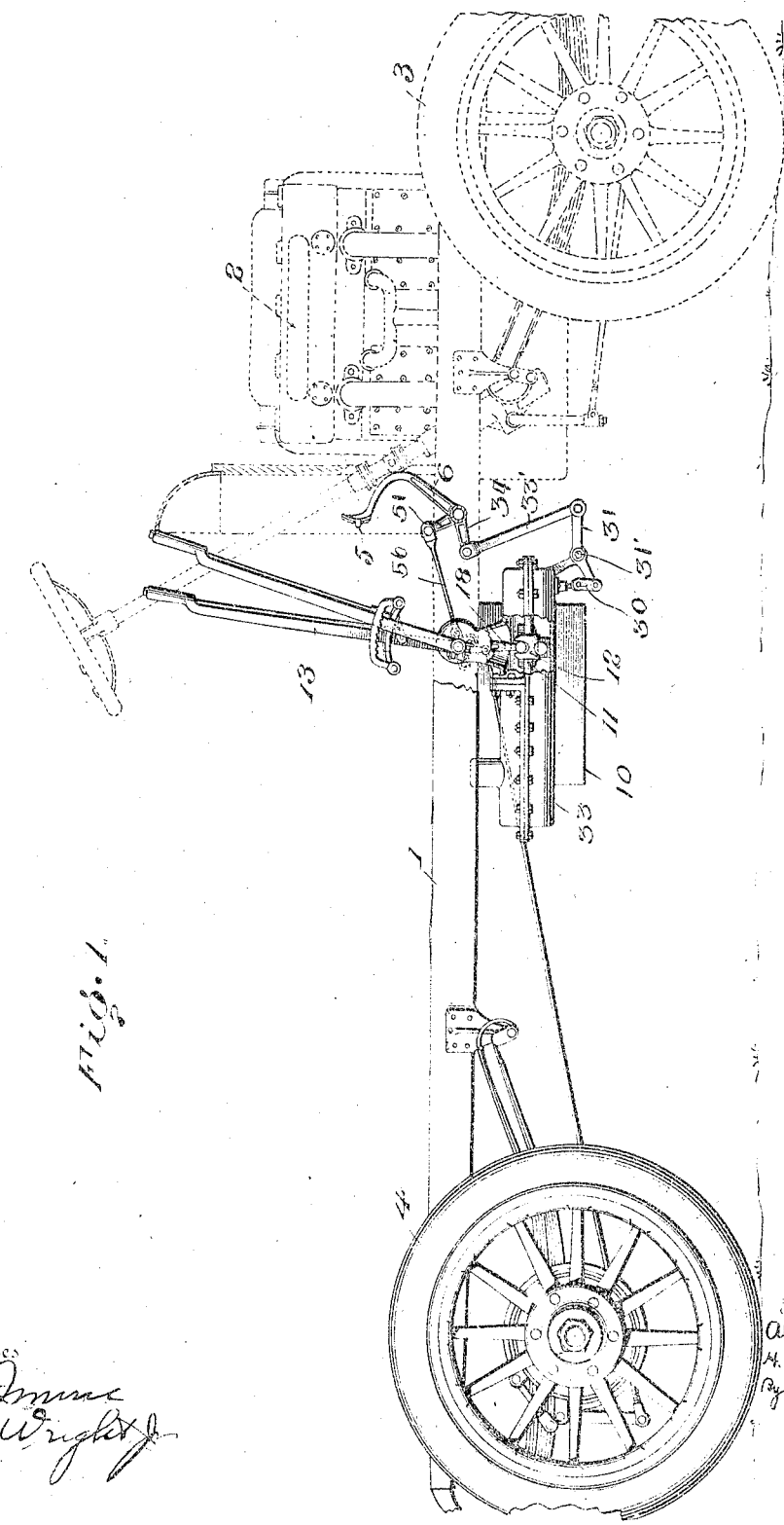

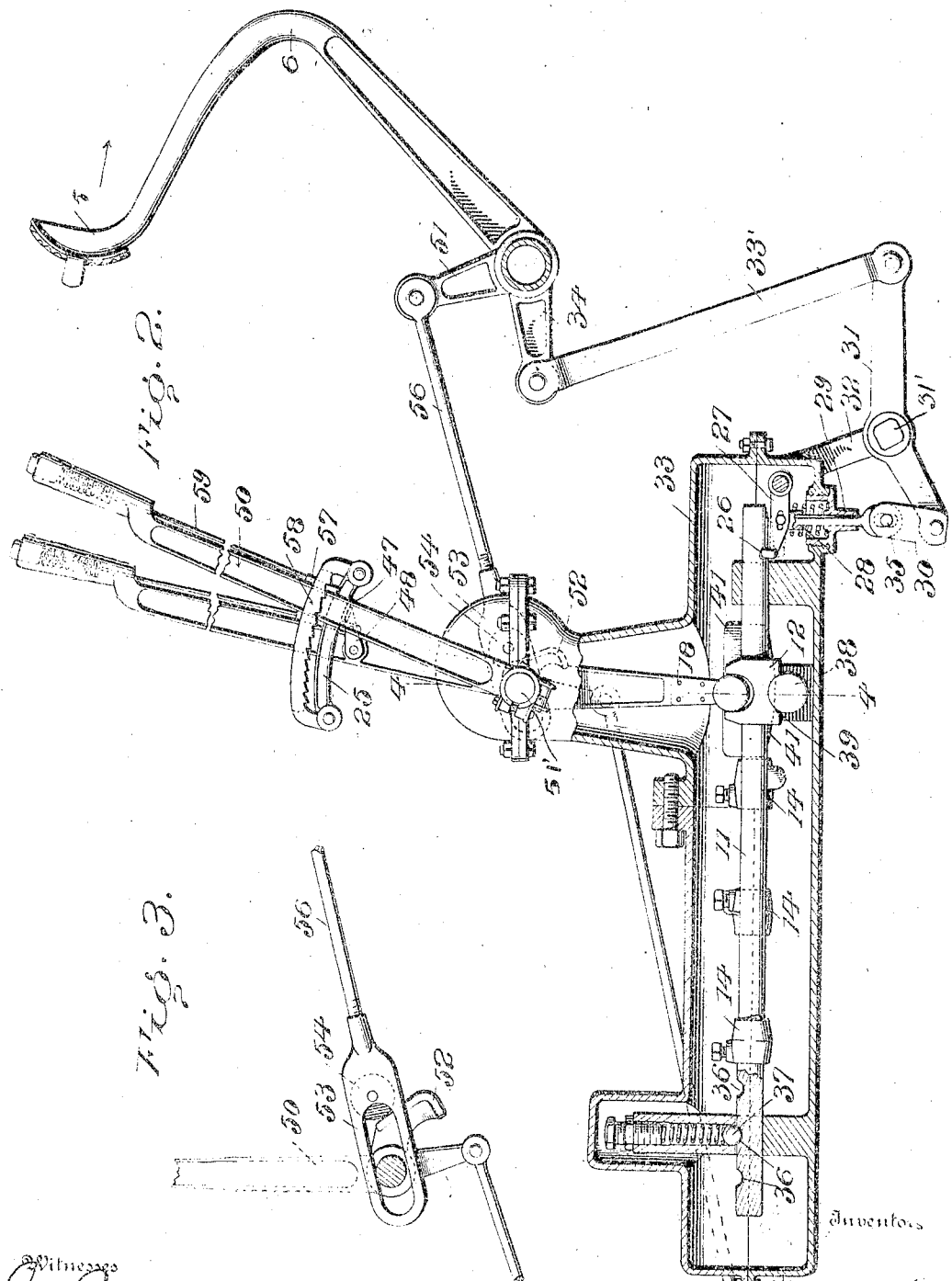

ALEXANDER WINTON AND HAROLD B. ANDERSON, OF CLEVELAND, OHIO, ASSIGNORS TO THE WINTON MOTOR CARRIAGE COMPANY, OF CLEVELAND, OHIO.

TRANSMISSION-CONTROLLING MECHANISM FOR MOTOR-VEHICLES.

1,095,056.

Specification of Letters Patent. Patented Apr. 28, 1914.

Application filed September 18, 1906. Serial No. 335,142.

*To all whom it may concern:*

Be it known that we, ALEXANDER WINTON and HAROLD B. ANDERSON, citizens of the United States, residing at Cleveland, in the county of Cuyahoga and State of Ohio, have invented certain new and useful Improvements in Transmission-Controlling Mechanism for Motor-Vehicles, of which the following is a specification, reference being had therein to the accompanying drawing.

This invention relates to improvements in transmission controlling mechanism for motor vehicles, and has relation to means and devices for controlling what is known in the art as "sliding gear transmission."

The particular type of "sliding gear transmission" with which the present invention is designed to coöperate is known as the "selective" type, and the object of the invention will be fully set forth hereinafter.

In the accompanying drawing: Figure 1 is a view showing in side elevation a motor vehicle chassis which comprises our invention. Fig. 2 is an enlarged detached side elevation of the features involving the invention, a portion of the supporting case thereof being shown in section. Fig. 3 is an enlarged detached view of the coöperating devices between the clutch pedal and brake lever.

Referring now to the drawings, 1 indicates the frame; 2 the engine; 3 the front supporting and steering wheels, and 4 the rear supporting and driving wheels, all of which may be of the usual construction.

As is well known, a single clutch is used for sliding gear transmissions of the "selective" type, and so far as the present invention is concerned any desired form of clutch may be used, and hence we do not show any specific form of clutch.

The clutch pedal 5 is at the end of an arm 6, and this arm 6 is suitably supported to permit an oscillating movement of the pedal. An arm 34 is suitably connected to a clutch (not shown) which is located in a clutch case 10. It is well known that in the form of clutch used with sliding gear transmissions, the clutch is normally held in operative engagement by means of a spring or springs, and hence this need not be shown or described.

When the clutch pedal is in the position shown in Fig. 2, it is in operative engagement, but when moved in the direction indicated by arrow in said figure, the clutch is moved out of operative engagement.

In the "selective" type here shown, there is employed a plurality of sliding rods 11, and each of these rods is provided with a recessed member or block 12, with which the controlling lever 13 coöperates in a manner to be presently explained. Each rod carries a member 14 that is suitably connected with the sliding gear mechanism, but as this forms no part of the present invention, the transmission mechanism and the connection of the members 14 therewith is not shown, nor is it necessary to a full understanding of the invention by those skilled in the art.

The connection between the clutch pedal 5 and the clutch mechanism, as here shown, comprises a link 33' which has its upper end pivotally connected with an arm 34, and its lower end connected with a lever 31, which is intermediately connected with a shaft 31'. This shaft 31' extends into the clutch case 10 and is suitably connected (not shown) to the clutch members (not shown) for operating them.

The transmission lever 13 is laterally movable (not shown) as is well understood by those skilled in this art and carries with it an arm 18, the lower end of which is adapted to engage with one of the blocks 12 of one of the members 11, to move it endwise for controlling the transmission mechanism in a manner well understood. This transmission lever also carries with it a segment 41, which engages a sliding rod 38, and this sliding rod is constructed to lock the members 11, except the one that is engaged by the arm 18.

Each of the members 11 is provided in its under side with a recess 26 and pivoted below these rods or members is a spring latch 27, wide enough and adapted to engage simultaneously the recesses 26 of all of the rods and lock them in their neutral positions, as shown in Fig. 2. Before any of the rods 11 can be moved by the transmission lever for controlling the gears of the transmission, the latch 27 must be disengaged from the recesses of the rods. This latch is removably held in the recesses by an expanding spiral spring 28, which surrounds a rod 29, the rod having its upper end connected to the latch intermediate its ends, while the lower end of the rod is connected with the upper end of the link 30.

The link 30 in turn has its lower end connected with one end of the lever 31, the shaft 31' of the lever being supported in an arm 32, which projects from the casing 33.

When the clutch is in operative engagement with the parts of the positions shown in Fig. 2, the latch is in locking engagement with the rods 11, and neither of them can be moved until the latch 27 is released by moving the clutch lever to a forward position and thereby release the clutch. At the same time that the clutch is released the latch 27 is disengaged from the recesses 26 of the rods 11, thus permitting any one of them to be actuated by a movement of the transmission lever 13.

From the foregoing it will be understood that the transmission controlling mechanism is locked when it is in a neutral position, and the clutch must be released before any of the gears can be put into mesh. So also, if the mechanism is operating through one series of gears it can not be changed without bringing the rod 11, which is controlling that mechanism, to its neutral position. When it reaches its neutral position, the latch snaps into the recess of the rod and locks it. A slot 35 in the link 30 permits the latch to have an upward movement independent of the lever 31, and independent of the clutch when the clutch is in operative engagement, sufficient to permit the latch to enter the recesses 26.

The rods 11 have recesses 36, in which spring detents or balls 37 engage, so that the operator can feel the engagement thereof when operating the transmission lever 13 and thus know when the parts are in proper position for the respective speeds.

A brake lever 50 is connected with the clutch pedal 5, so that when the brake is applied the clutch is released. This is accomplished as follows: The clutch pedal 5 has connected with it an arm 51, the outer end of which is pivotally connected with a link 56. The inner end of this link carries a slotted member or yoke 53 having a roller 54 at its forward end. The shaft 51', to which the brake lever 50 is connected, carries a cam 52, adapted to engage the roller 54 when the brake lever is in its applied position, thus forcing the link 56 forward, and by this connection with the clutch pedal will release the clutch. When the brake parts are in the neutral position shown in Fig. 2, the slotted yoke 53 permits the clutch pedal to be moved into releasing position independent of the brake, a spring catch or pawl 57 co-acting with a ratchet segment 58, serves to hold the brake lever in the applied position until released by depressing the rod 59.

Having thus described our invention, what we claim and desire to secure by Letters Patent is:

1. In a controlling mechanism for motor vehicles, the combination of a clutch controlling lever, a brake lever shaft, a brake and a brake lever connected with said shaft, a cam directly carried by said shaft, a rearwardly extending link having one end pivotally connected with the clutch lever and its opposite rear end having an elongated slot through which the brake lever shaft passes, the link having a cam surface engaged by said cam.

2. In a controlling mechanism for motor vehicles, the combination of a brake, a brake shaft operatively connected with the brake, a brake lever, the brake shaft having a cam, an oscillating clutch pedal arm operatively connected with the clutch mechanism, a link having one end pivotally connected with the clutch pedal arm, the opposite end of the link having an elongated slot embracing the brake shaft, the link adapted to be engaged by said cam for operating the clutch lever, and the link having a movement upon the brake shaft independent of the cam to permit the clutch pedal to be operated independently of the brake shaft and its cam for the purpose described.

In testimony whereof we affix our signatures in presence of two witnesses.

ALEXANDER WINTON.
HAROLD B. ANDERSON.

Witnesses:
O. F. BAUGHMAN,
A. S. NEWTON.